July 2, 1968  A. L. A. GREGORI  3,390,786
OVERHEAD MATERIAL CONVEYING SYSTEM
Filed June 26, 1967  4 Sheets-Sheet 1
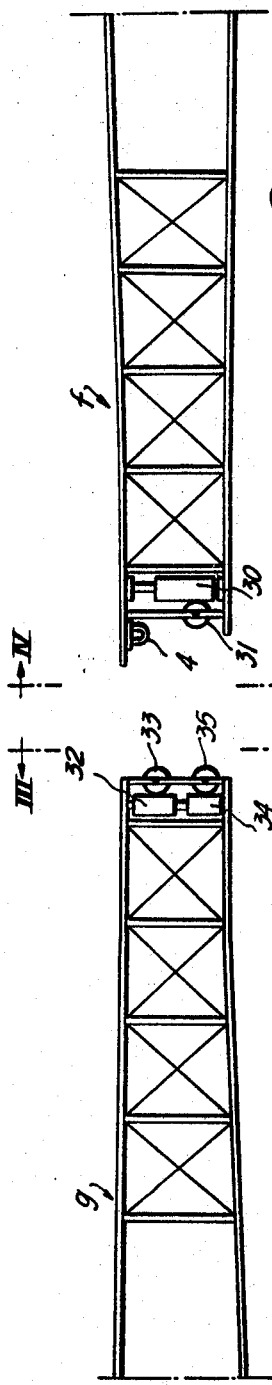
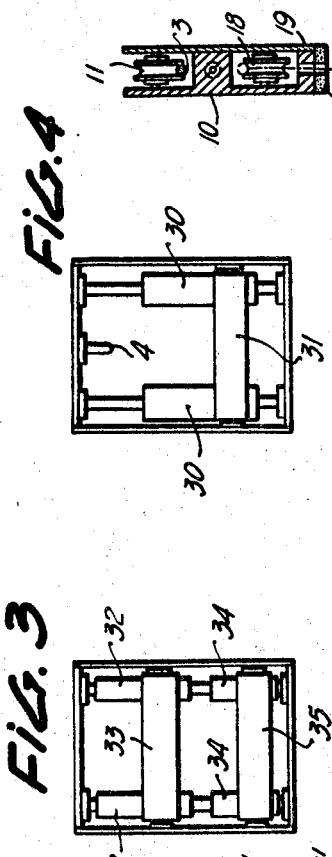
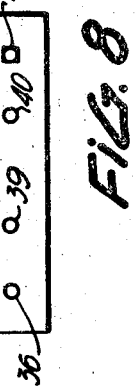
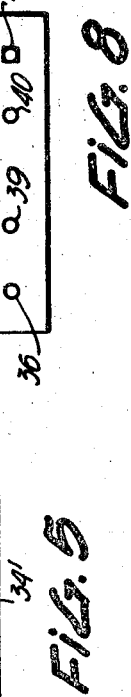
INVENTOR
A.L.A. Gregori
BY Jaroslav Orloff,
ATTORNEYS

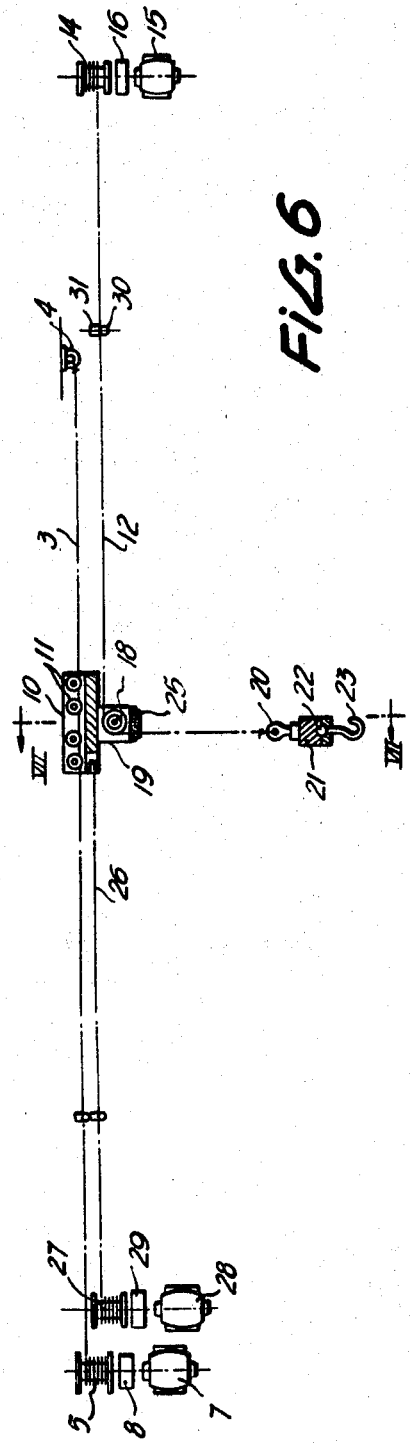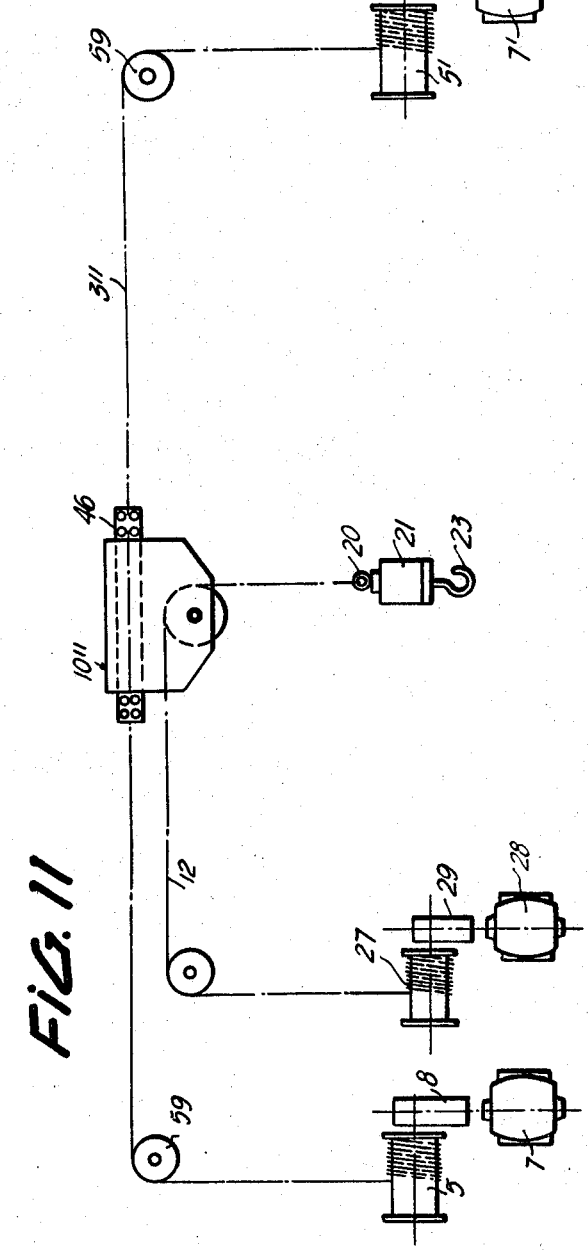

July 2, 1968 A. L. A. GREGORI 3,390,786
OVERHEAD MATERIAL CONVEYING SYSTEM
Filed June 26, 1967 4 Sheets-Sheet 3
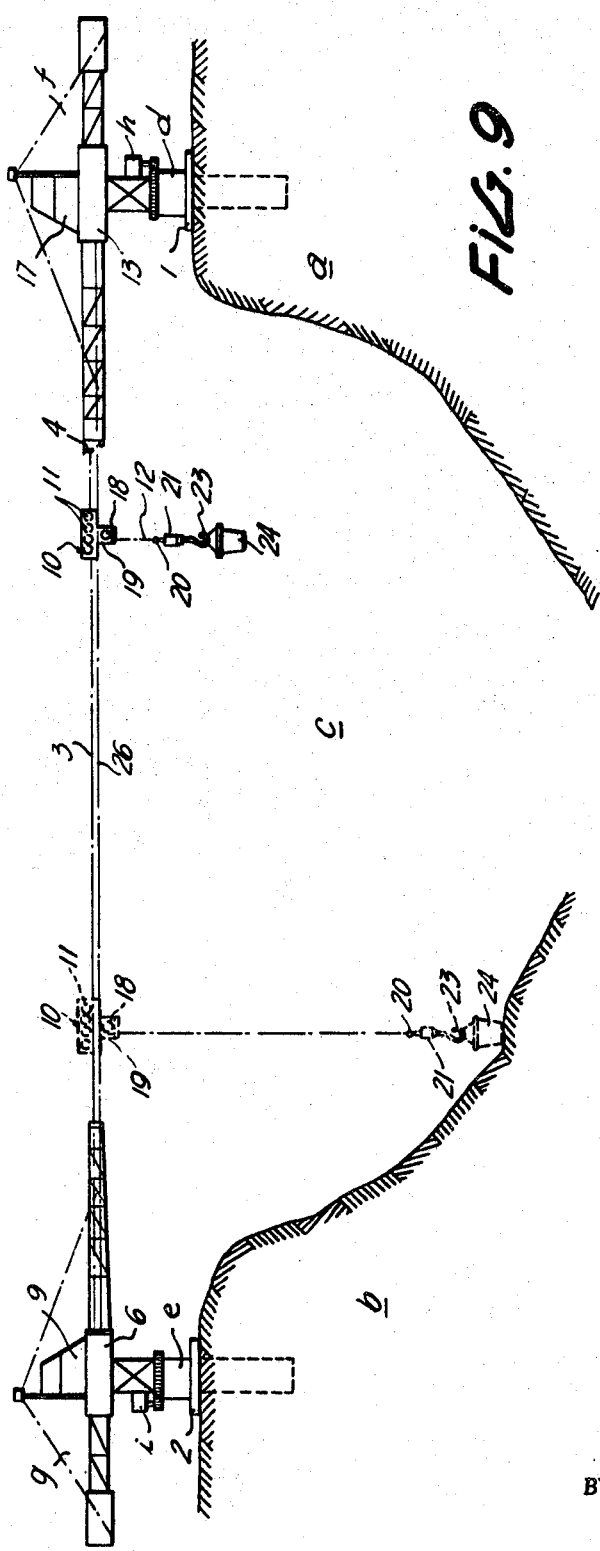
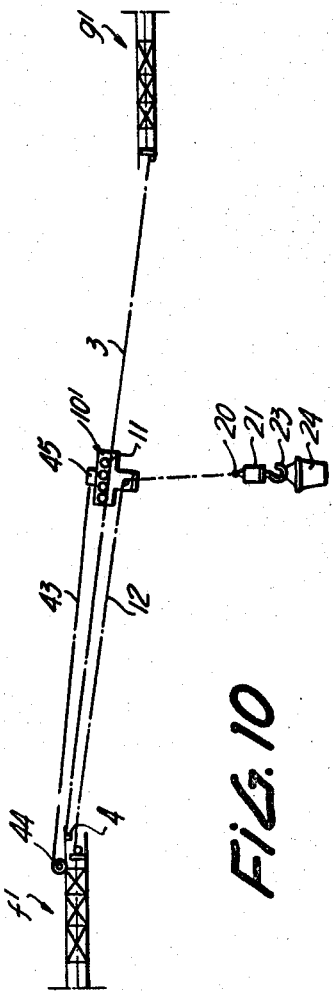
INVENTOR
A.L.A. Gregori
BY
ATTORNEYS July 2, 1968  A. L. A. GREGORI  3,390,786
OVERHEAD MATERIAL CONVEYING SYSTEM
Filed June 26, 1967  4 Sheets-Sheet 4
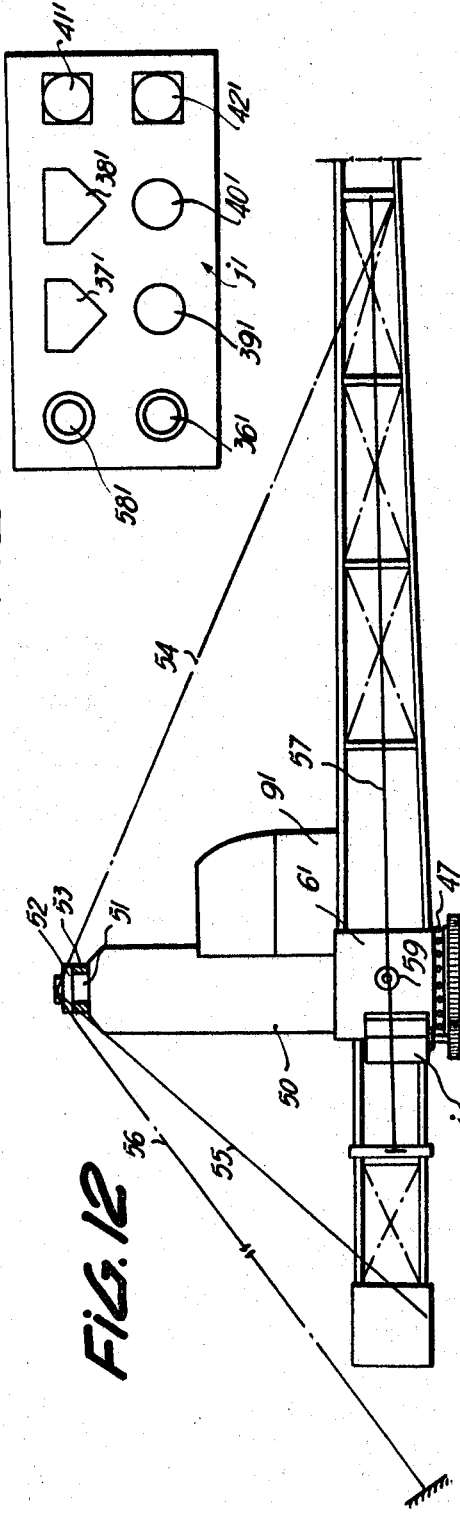
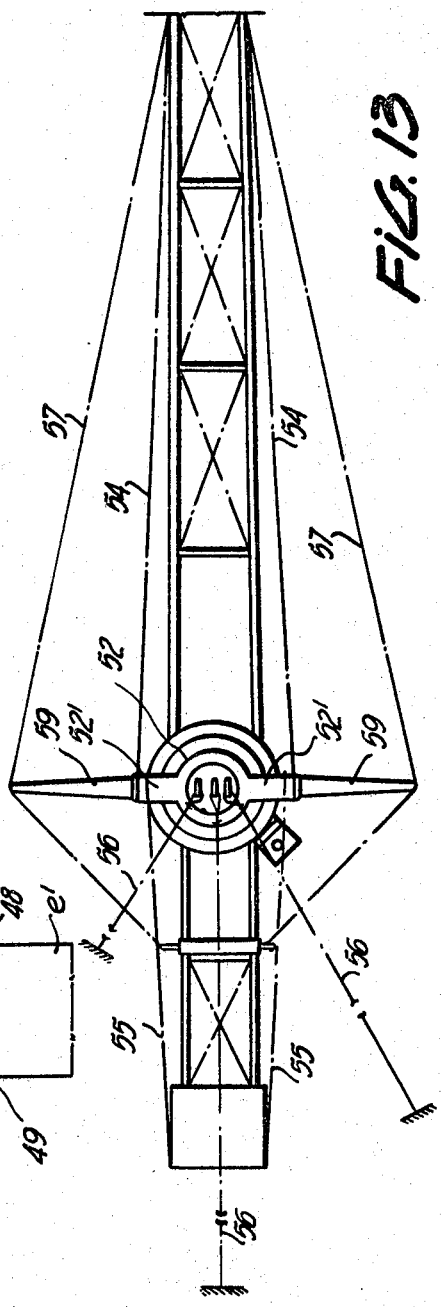
INVENTOR
A.L.A. Gregori
BY
ATTORNEYS United States Patent Office 3,390,786
Patented July 2, 1968

3,390,786
OVERHEAD MATERIAL CONVEYING SYSTEM
Alberto Luis Antonio Gregori, 4561 Cervino St.,
Buenos Aires, Argentina
Filed June 26, 1967, Ser. No. 648,923
Claims priority, application Brazil, Sept. 30, 1966,
183,324
9 Claims. (Cl. 212—73)

ABSTRACT OF THE DISCLOSURE

The overhead material conveying system is mainly conceived for transporting bulk material and the like, between two long distance spaced apart stations, usually arranged on the peaks or slopes of two hills or mountains forming therebetween a valley, gulley or gorge and wherein a dam, bridge or the like is to be built or repaired. The overhead conveying system enables to supply materials to a substantially rectangular zone between said stations and is particularly used where the terrain is such that truck or rail transportation is not practical.

BACKGROUND OF THE INVENTION

(1) Field of the invention

This invention relates to an overhead material conveying system for transporting bulk material and the like between two long distance spaced apart stations and which is able to supply materials to a substantially rectangular zone between said stations. More particularly, the invention refers to an overhead conveying system using a cableway consisting of a track-cable, a traction rope which may be part of the track-cable, a material conveyor and riser rope and a trolley with its carrier for transporting bulk material from a deposit, generally existing aside at least one of said stations, to the working zone and is particularly suitable for the building or repairing of dams, bridges and the like in hilly zones of the country.

The present invention, according to one of its embodiments, is of the type consisting of a cableway having a track-cable with a trolley movable therealong. The cableway is arranged between two stations, each consisting of a stationary tower having a boom rotatable thereabout and each station being arranged on one side of the gulley on the peak or slope of a hill or mountain and between the two hills of which a structure, such as a dam or a bridge, is to be raised or repaired. These booms which are capable of carrying out a circular or rotary to and fro movement around each tower, are journalled on the respective tower, and are preferably located in a horizontal plane in the upper end portion of the pertinent tower. More specifically, these towers are in turn stationarily mounted on concrete or the like base portions prepared on the hills and which base portions are as such small and of relatively simple structure. Thus, the installation of the system is comparatively cheap and may be satisfactorily used not only for performing new structures, but also for carrying out repairs in existing structures.

In other words, the present invention refers to a system for the overhead transport of material through a valley or the like with a comparatively simple arrangement of parts and which may cover a substantially relatively large rectangular surface, in spite of which merely two booms are required, which are interrelated by an overhead cableway system. From the foregoing it can already be conceived that the booms, which can describe an arcuate path which can be smaller or larger than 180°, can supply or feed a relatively large working surface. One of the features of the system according to the present invention is that the tip portion of each boom is connected to a control rope arrangement which is arranged below the track cable. The control rope arrangement has a material conveyor and riser rope for raising, lowering and moving along the track-cable a carrier, having a trolley rollably arranged on said track-cable. The trolley is furthermore linked in one of the embodiments, to a complementary control rope, which is actually a traction rope, to move said trolley along the track-cable. Both the track-cable and the traction rope have one of their ends entering the tip of one of the booms and are wound on corresponding drums. Each of the drums is coupled to a pertinent reversible driving unit, such as an electrical motor with a gear box thereinbetween. The other end of the track-cable is linked to a stationary point of the tip of the other boom, while the material conveyor and riser rope has one of its ends wound on a further drum coupled to a similar driving unit.

(2) Description of the prior art

In this particular art most of the known ropeways, cableways or overhead transports are only able to supply materials to a circular segment area or a lineal area which is highly unsatisfactory. The socalled "blondin system," a more developed embodiment, suggests a pair of towers movable along rails built on the slopes of the hills, with a cableway between them. To build the rail tracks in most of the cases is very expensive, since a lot of ground work has to be done to obtain two parallel tracks, so that the towers may be moved therealong, in order that the cableway may cover a rectangular zone. Several drawbacks are present in those blondin systems, one of which is that the movement of these towers is very slow. Another drawback is that usually it is quite windy in those places and since these towers are mounted on rails, the entire arrangement becomes rather unsafe, inasmuch as these towers are subect to excessive forces which may derail and/or tilt them.

Summary of the invention

It is an object of the present invention to provide a system capable of feeding substantially rectangular areas which are proportional to the distance between the towers and the portion of the length of the booms between the tips and the pertinent towers which support these booms. This makes the system according to the present invention particularly suitable for the building of dams, bridges and the like operations in countrysides with steep mountain portions and rather deep valleys or gullies, at a substantially smaller cost and higher safety coefficient, than was possible up to now.

Another purpose is to provide an overhead material conveying system, where the towers can be raised on rather small platforms themselves thereby requiring not much ground work and they can be arranged right at the side of a precipice.

A further object of the present invention is to provide a system which enables to operate with considerably spaced apart stations and at fast operation cycles, in addition to which in the majority of the cases the conveying of the bulk material is carried out by taking advantage of the force of gravity and the carrier with the bucket or the like conveyor for the material and is returned to the station where new material is to be charged at a rather high speed. Furthermore, the horizontal as well as the vertical movements of the conveyor or bucket can be carried out in a combined way, so that the speed is still further increased.

An additional object of the present invention is that the system can perfectly resist hurricanes with winds of more than 50 miles per hour, by simply aligning the booms and keeping the cableway loose, so that the track-cable as well as the control rope arrangement act as a resilient oscillating brake, whereby any danger of damaging the installation is substantially decreased.

It is to be pointed out that with a system according to the present invention it is not necessary that the cableway is under tension, due to the absence of return cable-tracks with their return pulleys (there are arrangements where the cableway must be so tense that the elastic limit is reached). More particularly, the safeness of the system during storms and hurricanes is due to the fact that the booms and cableway are kept loose in such a way that the cableway forms a rather outstanding arc, so that the bucket is located at a point below the straight line passing through the facing tips of the booms. Any gust of wind will raise the bucket which returns thereafter to its lower position, thus acting as a damper. The same is true for the cableway and thus the pair of booms are always returning to their coaxial position.

Another object of the present invention is to provide a system where the material may be charged right adjacent any of the towers without requiring next to the station of said tower a large platform, as is necessary in the embodiments so far known.

Although from the foregoing it is apparent that the invention has been analyzed rather in relationship to one of the preferred embodiments thereof, where a pair of booms comprises a cableway having a track-cable and a control rope arrangement consisting of a traction rope and a material conveyor and riser rope, it is possible to replace said cableway by another assembly where the control rope arrangement consists of a single cable and the track-cable at the same time performs part of the control rope arrangement task, thereby providing a system with less cables. Such a system is particularly suitable for those cases where the distance existing between the two stations is not too long.

Further alternatives will be described in connection with the specific embodiments.

BRIEF DESCRIPTION OF THE DRAWINGS

In order to facilitate the comprehension of the present invention, reference will now be made, by way of example, to several structural preferred embodiments, in relation to the accompanying drawings, wherein:

FIG. 1 is a lateral side elevation, showing the front end portion of one of the booms, forming part of the overhead system according to the present invention.

FIG. 2 is a side elevation showing the front end portion of the other boom.

FIG. 3 is a front elevation along line III—III of FIG. 1.

FIG. 4 is a front elevation along line IV—IV of FIG. 2.

FIG. 5 is a front elevation of another embodiment of the front portion of the boom which replaces the arrangement shown in FIG. 3.

FIG. 6 is a schematic lay-out, showing in side elevation the portion of the system including the trolley and carrier, the cableway including the track-cable and the control rope arrangement including the material conveyor and riser rope and the traction rope and the way these cables and ropes are respectively linked to their control drums having pertinent driving units.

FIG. 7 is a longitudinal sectional detail of a portion of the embodiment shown in FIG. 6, according to line VII—VII.

FIG. 8 is a front view of a switchboard for controlling the operation of the system.

FIG. 9 is a side elevation of the system showing in full line the position of the bucket during transport of the material towards the area to be served and in dotted lines the position of the bucket ready for discharging the bulk material, where it is to be used.

FIG. 10 is a schematic lay-out of an alternative embodiment of the system.

FIG. 11 is a schematic lay-out of a further alternative embodiment of the system.

FIG. 12 is a side elevation of a portion of the boom and corresponding tower.

FIG. 13 is a top plan view of the assembly shown in FIG. 12.

FIG. 14 is a front elevation of a switchboard with the means necessary for operating the alternative embodiment of FIG. 12.

DESCRIPTION OF THE PREFERRED EMBODIMENTS

The overhead material conveying system hereinbelow described is particularly suitable to be arranged on the peaks of a pair of hills $a$ and $b$ (FIG. 9) spaced apart by a rather steep valley or gully $c$, where for instance a bridge (not shown) has to be built. On the peaks of the hills $a$ and $b$, respective towers $d$ and $e$ are mounted and which are anchored on pertinent platforms 1 and 2. The upper portion of each of the towers $d$ and $e$ rotatably support respective booms $f$ and $g$. Each boom is adapted to rotate in a horizontal or slightly upwardly sloped plane and within a predetermined angular path. The platforms 1 and 2 of the columns $d$ and $e$ are arranged adjacent the precipice of the hills $a$ and $b$.

Between both booms $f$ and $g$ a cableway is arranged, comprising a track-cable 3 linked by one of its ends to a semicircular ring shaped hook 4 (see also FIGS. 2 and 4) connected to the front end portion or tip of the boom $f$. Said track-cable 3 enters through the front end portion or tip of the other boom $e$ and is connected to a drum 5 (FIG. 6) which enables to wind up and unwind said cable 3. Drum 5 is mounted in housing 6 (FIG. 9) of boom $g$ together with a driving unit consisting of a motor 7 (FIG. 6) and a speed gear box 8. On top of housing 6 a conventional cabin 9 is arranged, where the operator may carry out the necessary commanding and control operations.

On the track-cable 3 a trolley 10 is slidably mounted adapted to move along said track-cable 3 in either direction. The trolley 10 has a plurality of grooved wheels 11 (FIG. 7) freely rotatable on pertinent axes and which grooved wheels ride on the track-cable 3.

As part of the control rope arrangement a material conveyor and riser rope 12 project through the boom $f$ of the tower $d$ arranged on hill $a$. The end portion of said rope 12 enters through housing 13 and is connected to a drum 14 which may wind up and unwind (FIG. 6) said rope 12. Drum 14 is coupled to a driving unit consisting of an electric motor 15 and a speed gear box 16. On the housing 13 again a conventional cabin 17 is arranged, wherein the operator may eventually sit to operate the system from that end.

The rope 12 runs along a grooved pulley 18 (FIGS. 6 and 7) arranged between the side brackets 19 of the trolley 10. The free end portion of said rope 12 is linked to a carrier consisting of a pivot ring 20 forming part of a counterweight 21, the lower portion of which supports a ball stud 22 integral with a hook 23 supporting in the embodiment as shown in FIG. 9 a bucket 24 used for conveying bulk material, while obviously any other means or platform may be suspended from hook 23. The lower end portion of the side brackets 19 is provided with a shock absorbing pad 25 against which the pivot ring 20 may bump. The pad 25 may for instance be made of a resilient material, such as rubber.

The trolley 10 (FIG. 6) has connected at the end portion facing the boom $g$ a traction rope 26 which projects through the free end portion of the boom $g$ and is connected to a drum 27 for winding up and unwinding said traction rope 26 by means of a driving unit consisting of an electric motor 28 and a speed gear box 29. This driving unit is housed in housing 6 (FIG. 9).

Boom $f$ is provided at its free end portion in a plane behind the semicircular ring shaped hook 4 with a group of three loosely mounted rollers (FIG. 4) two vertical parallel ones 30 and a horizontal one 31. These rollers 30, 31 act as rotatable guiding members for the material conveyor and riser rope 12.

Boom g carries at its free end portion (FIG. 3) two groups of three rollers for the track-cable 3 and the traction rope 26, respectively. The upper group consists of three rollers, two paallel vertical ones 32 and a horizontal one 33 adjacent the lower end portion of rollers 32. Similarly, the lower group consists of rollers formed by two parallel vertical ones 34 and a horizontal one 35. The rollers of the upper group define the rolling guide means for the track-cable 3 and the rollers of the lower group define the rolling guide means for the traction rope 26.

In the arrangement shown in FIGS. 3 and 4, rather large diameter and heavy rollers are required to be able to absorb the loads to which the moving cables and ropes are subject. This can be avoided in case the cableway operates with a large sag between the stations, such as in those cases where the platforms of the stations are at a considerable height with regard to the gully, where the work is to be performed. In this event the arrangement as shown in FIG. 5 is used, in which the free end portion of boom g is provided with an annular bushing 30′ in which a ring 31′ is rotatably mounted provided with a shaft 32′. Ring 31′ defines with the shaft 32′ a cross-head which may rotate within stationary annular bushing 30′. On shaft 32′ two freely rotatable pulleys 33′ and 34′ are mounted over which track-cable 3 and traction rope 26 passes, respectively. As the boom g rotates in the horizontal plane, the ring 31′ carres out a compensatory rotary movement, so that the track-cable 3 is always subject to a rolling movement over pulley 33′ and not to a sliding movement over the roller as is the case in the embodiment of FIG. 3. The same is of course true for traction rope 26 and its pulley 34′. Obviously, it is possible to eliminate ring 31′ and mount shaft 32′ directly in the annular bushing 30′. Since it is merely the elimination of one part and it is readily understandable to anybody skilled in the art, it is considered unnecessary to make a specific drawing thereof.

For the free end portion of the other boom, that is to say boom f, where the semicircular ring shaped hook 4 is arranged, only one pulley would be required, that is to say a pulley of the type of pulley 33′ if this alternative embodiment is used. Since again the embodiment is substantially identical to the one shown in FIG. 5, no specific drawing is considered necessary in order to enable anybody skilled in the art to understand the foregoing.

Motors 7, 15 and 28 (FIG. 6) as well as motors h and i (FIG. 9), which latter rotate the booms f and g around the towers d and e, respectively, are each provided with suitable braking means (not shown) to stop the motors at will, as is well known in the art.

Motors 15 and 28, as well as motors h and i, are synchronized by means of conventional circuits (not shown), in order that the starting and stopping is simultaneous, as well as the r.p.m. at each instant.

The entire circuit arrangements, controls and devices which control the operation of the system are housed in a cabinet near the towers, that is to say the stations, or directly in the cabins. In addition, there is preferably provided portable equipment (not shown), so that the operator may go any place in order to transmit the necessary command to the switchboard or central station.

A typical switchboard j is shown in FIG. 8 and comprises a push button 58 controlling the rotation of the booms f and g in one direction; a push button 36 controlling the rotation of the booms in opposite direction; a key 37 controlling the movement of the trolley 10 towards the position where the material is required; a key 38 controlling the movement of said trolley back to its starting point; a push button 39 controlling the upward movement of the material conveyor and riser rope 12; a push button 40 controlling downward movement of said rope 12; a push button 41 controlling the winding up of the track-cable 3 on its drum and a push button 42 controlling the reverse movement of the motor 7.

Additional devices which as such are known and which cooperate with the electric devices are also provided and will not be specifically described nor shown, such as for disconnecting at the end of the path the pertinent switches, protective circuits and the like are also provided, so that the entire arrangement becomes as automatic as possible.

The operation of the system is carried out as follows:

Supposing that the bucket 24 is located adjacent platform 1 of hill a, but above the latter and that the operator presses down key 37 starting thereby motors 15 and 28; motor 5 will unwind cable 12 from drum 14 while motor 28 will wind up the traction rope 26, so that the bucket 24 can carry out its movement on the cableway towards the zone where the material has to be supplied, to which end the booms f and g are simultaneously rotated through motors h and i which are operated by pressing down push button 58. Upon arriving to the required position, the rotation of the booms is stopped by means of the brake (not shown) upon ceasing the pressure on push button 58. At this instant, the operator presses down push button 40 which controls the operation of motor 15 (which operates simutlaneously with motor 28) and releases key 37, whereby motor 28 stops and is braked, so that the material can start its downward movement since the motor 15 continues unwinding cable and the trolley 10 remains stationary.

Supposing that the operator stops the system prior to reaching its desired point to descent, it is sufficient to cease pressure on push button 40 and press again on key 37, whereby the bucket carries on its movement in the lengthwise direction along the horizontal, i.e., along the cableway. On the other hand, if the operator should have passed the desired point of descent he can move back said bucket by operating key 38, whereby the trolley moves in the opposite direction along the cableway. Such a movement in opposite direction, i.e., towards hill a of the trolley along the cableway is achieved due to the fact that the material conveyor and riser rope 12 which supports the bucket 24 operates as a return mover, since the trolley will not remain stationary in its position, due to the fact that the drum 27 has been released or is unwinding and the weight of the bucket exerts a downward force while its rope 12 is not allowed to unwind, whereby the resultant force moves the trolley towards hill a. In other words, the motor 15, in order to raise the bucket, requires a stationary point which is provided by pulley 18 when the trolley becomes blocked on the track-cable 3. If the trolley is free to carry out a return movement, as happens upon pressing down key 38, the upward movement of the bucket is only an apparent one, because the weight of the bucket to which the weight of the material contained therein is to be added, overcomes the resistance of the trolley forcing it to return, thereby obtaining the returning movement towards hill a. This is of course true with the exception of the last final feet towards platform 1.

In the embodiment shown in FIG. 10 an alternative of the overhead material conveying system is shown, where the same reference numerals have been used to identify the same parts as those used in the just described arrangement. This arrangement is used when the two stations are arranged at different levels. The trolley 10′ is adapted to move forward towards the boom g′ by the force of gravity since the boom g′ is arranged at a lower level than the boom f′. The track-cable 3 is arranged in the same way as in the embodiment described and shown in connection with FIGS. 1 to 9. In the present alternative the traction rope becomes unnecessary since the role thereof is carried out by the force of gravity. The material conveyor and riser rope 12 acts in this embodiment also as the traction rope for moving trolley 10′ towards boom f′, the one on the higher level. A traction is achieved by rotating the drum (not shown) to which said rope 12 is connected in such a way as to produce the winding up of the rope 12. The unwinding of the rope results in that the trolley moves towards boom g', the one on the lower level, thereby moving within a certain tolerance, for instance the bucket 24 towards the desired point. In addition, an electricity conducting cable 43 is provided in this embodiment, mounted on a spring urged wind up reel 44 supported by the boom f' while the other end of said cable 43 controls an electromagnet 45 operating a cable brake (not specifically shown, but schematically represented by the same box identified by reference numeral 45) and which enables to stop the trolley 10' on the track-cable 3, as is already well known as such in the art. Upon then further unwinding rope 12, the bucket 24 will descend and upon winding up said rope, bucket 24 will be raised, as long as the trolley 10' is blocked on the track-cable 3.

In the further alternative embodiment shown in FIG. 11, wherein again for identical parts the same reference numerals have been used, the trolley 10" is pivotally mounted on tubular member 46 projecting out of said trolley 10" on both sides. Track-cable 3" passes through tubular member 46 and the ends of tubular member 46 are clamped to said track-cable 3". Thus cable 3" is a track and supporting cable. Track-cable 3" passes over guiding pulleys 59 mounted in the respective booms (not shown) and are linked to pertinent wind up drums 5 and 5' driven by driving units or motors 7 and 7'. Likewise, in this embodiment the traction rope is omitted since track-cable 3" performs at the same time this function, while rope 12, to which the hook 23 is linked, behaves in the same way as previously described, with the exception that the movement of the trolley is controlled by cable 3". For this embodiment the switchboard j' as shown in FIG. 14 is used having the keys 37' and 38' (in operative relationship with three motors 7, 7' and 28) which control the trolley; the key 37' controls the forward movement of the trolley; the key 38' controls the return movement of the trolley; the push button 41' controls the cable 3" to tension it; the push button 42' controls the cable 3" to loosen it; the push buttons 39' and 40' control the upward and downward movement of the hook 23, respectively, and the push button 58' and 36' control the rotation of the booms and the blocking of said rotary movement, respectively.

In FIGS. 12 and 13 another embodiment of the boom is shown, which is a particularly useful embodiment for rather long booms. In this arrangement, the tower e' comprises preferably a foot step bearing 47. There is a crown gear 48 mounted on the upper portion of the tower and below the housing 6'. A pinion 49 meshes with said crown gear 48 and is mounted on a shaft controlled by motor i having obviously a speed gear box (not shown). A vertical column 50 projects out of housing 6' and the cabin 9' is linked thereto. On the upper end of said column 50 there is an upstanding shaft 51 on which a cross head 52 is mounted and an antifriction ring 53 is arranged in between the upper end of said column 50 and said cross head 52. Cross head 52 has a pair of arms 52', tensioners 54 and 55 are connected to said arms 52', so that upon the boom starting to rotate about its tower the tensioners 54 and 55 urge on the arms 52' which thus likewise rotate. Tensioners 56 are anchored to said upstanding shaft 51 by one of their end portions, while the opposite end portions are anchored to the ground surface.

Housing 6' is provided with a pair of diametrically opposite tubular anchoring members 59 to which tensioners 57 are anchored which are furthermore anchored to the front and rear portions of the boom, thereby reinforcing the boom to better resist flection.

Although in all the embodiments only a bucket 24 has been shown as connected to the hook 23, this arrangement can be replaced by any other suitable device as may be required for each work to be performed; for instance a clamshell may be used.

I claim:
1. An overhead material conveying system for transporting bulk material and the like between two long distance spaced apart stations and which is able to feed a substantially rectangular zone therebetween, said system comprising a stationary tower at each station, a boom rotatably supported by each tower, each boom being adapted to rotate in a substantially horizontal plane, each boom having a free end portion, said free end portions being adapted to face each other, a lengthenable cableway arranged between said free end portions, a trolley movable between said free end portions and supported by said cableway, said cableway including a lengthenable material conveyor and riser rope passing through said trolley, said rope having a first end portion and a second end portion, said first end portion hanging from said trolley and having supporting means, and said second end portion passing through the free end portion of one of said booms.

2. The overhead material conveying system as claimed in claim 1, wherein said trolley has grooved wheels, said cableway includes a track-cable arranged between said free end portions of said booms, said grooved wheels of said trolley rolling on said track-cable.

3. The overhead material conveying system as claimed in claim 2, wherein said cableway further including a traction rope, said trolley being connected to said traction rope which is lengthenable, said traction rope being furthermore related to the boom opposite to the one having said material conveyor and riser rope.

4. The overhead material conveying system as claimed in claim 2, wherein the free end portions of said booms are arranged at different levels and said trolley being furthermore provided with remote operable cable clamping means, for braking and stopping said trolley along said cableway.

5. The overhead material conveying system as claimed in claim 2, wherein said track-cable has a first end portion linked to said free end portion of one of said booms, said track-cable having a second end portion, a drum, a driving unit for driving said drum, said second end portion being connected to said drum and said drum is mounted in the station of the other of said booms.

6. The overhead material conveying system as claimed in claim 1, wherein said cableway comprises a track and supporting cable, said carriage being clamped to said track and supporting cable but pivotally mounted thereon, said track and supporting cable entering through said free end portions of each of said booms, each of said booms supporting a drum to which said track and supporting cable is connected, said drums being connected to respective driving units for rotating said drums in either direction.

7. The overhead material conveying system as claimed in claim 1, wherein said second end portion of said material conveyor and riser rope being wound on a drum, a driving unit for rotating said drum in either direction.

8. The overhead material conveying system as claimed in claim 1, wherein said free end portion of each of said booms, supporting roller means for guiding said cableway.

9. The overhead material conveying system as claimed in claim 8, wherein each roller means for guiding said cableway comprises an annular bushing which is stationarily mounted in said boom, a shaft diametrically extending through said bushing and slidably mounted thereon, at least one pulley mounted on said shaft.

References Cited
UNITED STATES PATENTS

| | | | |
|---|---|---|---|
| 1,451,259 | 4/1923 | Harrington | 212—73 |
| 1,944,054 | 1/1934 | Ackerman | 212—73 |

ANDRES H. NIELSEN, *Primary Examiner.*